US009436516B2

(12) United States Patent
Kaneko et al.

(10) Patent No.: US 9,436,516 B2
(45) Date of Patent: Sep. 6, 2016

(54) VIRTUAL MACHINES MANAGEMENT APPARATUS, VIRTUAL MACHINES MANAGEMENT METHOD, AND COMPUTER READABLE STORAGE MEDIUM

(71) Applicant: KABUSHIKI KAISHA TOSHIBA, Minato-ku, Tokyo (JP)

(72) Inventors: Yu Kaneko, Yokohama (JP); Shigeo Matsuzawa, Chofu (JP); Tomonori Maegawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 141 days.

(21) Appl. No.: 14/317,531

(22) Filed: Jun. 27, 2014

(65) Prior Publication Data

US 2015/0007178 A1    Jan. 1, 2015

(30) Foreign Application Priority Data

Jun. 28, 2013  (JP) .................................. 2013-137221

(51) Int. Cl.
*G06F 9/455* (2006.01)
*G06F 9/50* (2006.01)

(52) U.S. Cl.
CPC .................................. *G06F 9/5088* (2013.01)

(58) Field of Classification Search
None
See application file for complete search history.

(56) References Cited

U.S. PATENT DOCUMENTS

| 8,091,063 | B2 * | 1/2012 | Laird | H01L 22/12 716/111 |
| 8,095,929 | B1 * | 1/2012 | Ji | G06F 9/4856 709/223 |
| 8,423,646 | B2 * | 4/2013 | Jamjoom | G06F 9/4856 709/203 |
| 8,615,579 | B1 * | 12/2013 | Vincent | G06F 9/4856 709/223 |
| 2012/0030346 | A1 * | 2/2012 | Fukuda | G06F 11/0709 709/224 |
| 2012/0166644 | A1 * | 6/2012 | Liu | G06F 9/4856 709/226 |
| 2013/0073731 | A1 * | 3/2013 | Bose | G06F 9/5088 709/226 |
| 2013/0086272 | A1 * | 4/2013 | Chen | G06F 9/4856 709/226 |
| 2013/0346973 | A1 * | 12/2013 | Oda | G06F 9/4856 718/1 |

FOREIGN PATENT DOCUMENTS

JP     2010-237730     10/2010

* cited by examiner

*Primary Examiner* — Diem Cao
(74) *Attorney, Agent, or Firm* — Nixon & Vanderhye, P.C.

(57) ABSTRACT

A virtual machines management apparatus includes a virtual machine controller, a history storage, and a planning module. The virtual machine controller is configured to migrate virtual machines between plural physical servers. The history storage is configured to store, for each set of first virtual machines that were migrated to a same migration destination physical server parallel in time among the virtual machines migrated, history information. The planning module is configured to determine as to whether it is possible to start migrating a planning target virtual machine to a candidate migration destination physical server at a candidate migration start time based on a residual resource amount of the candidate migration destination physical server, a resource consumption of the planning target virtual machine, a sum of resource consumptions of migration-scheduled virtual machines, and the history information.

11 Claims, 15 Drawing Sheets

FIG. 4

| PS-ID | MEASUREMENT TIME | POWER STATE | CPU USE AMOUNT (%) | NUMBER OF TIMES OF USE OF CONTEXT SWITCH | MEMORY USE AMOUNT (GB) | SWAP GENERATION AMOUNT | STORAGE USE AMOUNT (GB) | STORAGE ACCESS AMOUNT (MB/s) | NETWORK USE AMOUNT (Mbps) | VM-IDs OF VMs IN OPERATION |
|---|---|---|---|---|---|---|---|---|---|---|
| PS_1 | 2013-04-03T13:00:00 | ON | 30 | 234 | 23.3 | 0 | 8.8 | 12 | 120 | VM_1, VM_2, VM_3 |
| PS_2 | 2013-04-03T13:00:00 | ON | 40 | 19 | 20.8 | 76 | 15 | 8.2 | 25 | VM_4 |
| PS_1 | 2013-04-03T13:10:00 | ON | 30 | 240 | 23.3 | 0 | 8.8 | 5.4 | 116 | VM_1, VM_2, VM_3 |
| PS_2 | 2013-04-03T13:10:00 | ON | 50 | 30 | 20.6 | 76 | 15 | 8.9 | 24 | VM_4 |

FIG. 5

| VS-ID | MEASUREMENT TIME | POWER STATE | CPU USE AMOUNT (%) | CS FREQUENCY | MEMORY USE AMOUNT (GB) | SWAP GENERATION AMOUNT | STORAGE USE AMOUNT (GB) | STORAGE ACCESS AMOUNT (MB/s) | NETWORK USE AMOUNT (Mbps) |
|---|---|---|---|---|---|---|---|---|---|
| VM_1 | 2013-04-03T13:00:00 | ON | 30 | 234 | 2.3 | 0 | 2.2 | 4 | 40 |
| VM_2 | 2013-04-03T13:00:00 | ON | 40 | 19 | 1.5 | 0 | 3.5 | 2 | 30 |
| VM_1 | 2013-04-03T13:10:00 | ON | 30 | 240 | 2.5 | 0 | 2.2 | 3 | 41 |
| VM_2 | 2013-04-03T13:10:00 | ON | 50 | 30 | 1.4 | 0 | 3.6 | 3 | 28 |

FIG. 6

| RESIDUAL RESOURCE AMOUNT OF LM DESTINATION PS | RESOURCE CONSUMPTION OF LIVE-MIGRATED VMs | LM PERFORMANCE (NUMBER OF VMs/SEC) | LM SUCCESS/FAILURE |
|---|---|---|---|
| 34 | 24 | 0.8 | SUCCESS |
| 30 | 36 | 0.5 | FAILURE |
| 30 | 24 | 0.7 | SUCCESS |
| 30 | 12 | 0.6 | SUCCESS |
| -15 | 30 | 0.2 | FAILURE |

FIG. 7

| DR INFORMATION ID | TIME SLOT | POWER UNIT PRICE (YEN/kWh) |
|---|---|---|
| 1 | 2013-04-05T13:00:00~2013-04-05T13:30:00 | 100 |
| 1 | 2013-04-05T13:30:00~2013-04-05T14:00:00 | 150 |
| 1 | 2013-04-05T14:00:00~2013-04-05T14:30:00 | 150 |
| 1 | 2013-04-05T14:30:00~2013-04-05T15:00:00 | 100 |

US 9,436,516 B2

VIRTUAL MACHINES MANAGEMENT APPARATUS, VIRTUAL MACHINES MANAGEMENT METHOD, AND COMPUTER READABLE STORAGE MEDIUM

CROSS-REFERENCE TO RELATED APPLICATION(S)

The present disclosure claims priority to Japanese Patent Application No. 2013-137221, filed on Jun. 28, 2013, which is incorporated herein by reference in its entirety.

FIELD

Embodiments described herein relate generally to a virtual machines management apparatus, a virtual machines management method, and a computer readable storage medium.

RELATED ART

IaaS (infrastructure as a service) has come into wide use as one form of cloud computing. IaaS is a service in which a service provider provides a virtual machine (VM) for a service user. The term "virtual machine" means a software implementation of hardware (a CPU, a memory, a storage, etc.) that constitutes a computer. Virtual machines operate on physical servers (PSs). In the following description, a virtual machine and a physical server may be abbreviated as VM and PS, respectively.

An IaaS service provider operates a group of physical servers on which virtual machines are to operate. Resources (a CPU, a memory, disks, a storage, a network, etc.) are allocated to a virtual machine when it is generated. In general, a physical server has larger resources than allocated to an individual virtual machine and hence plural virtual machines operate on a single physical server.

The amount of resources that are actually consumed by each virtual machine varies. Server operators try to let as many virtual machines operate on a single physical server as possible by taking resource consumption variations into consideration because a decrease in the number of physical servers in operation leads to reduction of a running cost such as an electricity charge. Therefore, if a physical server exists which has resources to spare, a server operator migrates a virtual machine currently operating on another physical server to the former physical server using a technique called live migration (LM). The live migration is a technique for migrating a virtual machine to another physical server without stopping the operation of the virtual machine.

For example, live migration is done in the case where the power unit price increases temporarily due to use of one technique of power supply/demand control called demand response (DR). In this case, to prevent the electricity charge from becoming unduly high, an IaaS provider makes the number of physical servers in operation smaller in time slots when the power unit price is high than in ordinary time slots. That is, the IaaS provider halts many physical servers in time slots when the power unit price is high. This makes it necessary to live-migrate many virtual machines from the group of physical servers to be halted to the other group of servers. However, the physical servers as live migration destinations do not have very large resources to spare because as described above the IaaS provider would be letting as many virtual machines operate on each physical server. It is also necessary to live-migrate virtual machines quickly because their performance lowers while they are being live-migrated.

Thus, when live migration is done in, for example, a situation that a demand response control is performed, it is desired to live-migrate many virtual machines quickly to physical servers having only small residual amounts of resources.

One conventional technique for live-migrating many virtual machines as quickly as possible is to live-migrate virtual machines parallel. It is expected that the live migration is completed earlier as more virtual machines are live-migrated parallel. However, in particular, where physical servers as live migration destinations do not have very large residual amounts of resources, their performance may lower. When a large number of virtual machines are live-migrated parallel, some of them may fail to live-migrate. Therefore, contrary to the intention, there may occur a case that increasing the number of virtual machines to live-migrate parallel results in increase in the time to complete the live migration of all virtual machines.

BRIEF DESCRIPTION OF THE DRAWINGS

FIG. 4 shows an example of various kinds of information stored in a PS status storage 103;

FIG. 5 shows an example of various kinds of information stored in a VM status storage 106;

FIG. 6 shows an example of various kinds of information stored in an LM history storage 109;

FIG. 7 shows an example of various kinds of information stored in a DR information storage 111;

DETAILED DESCRIPTION

Figure 1:
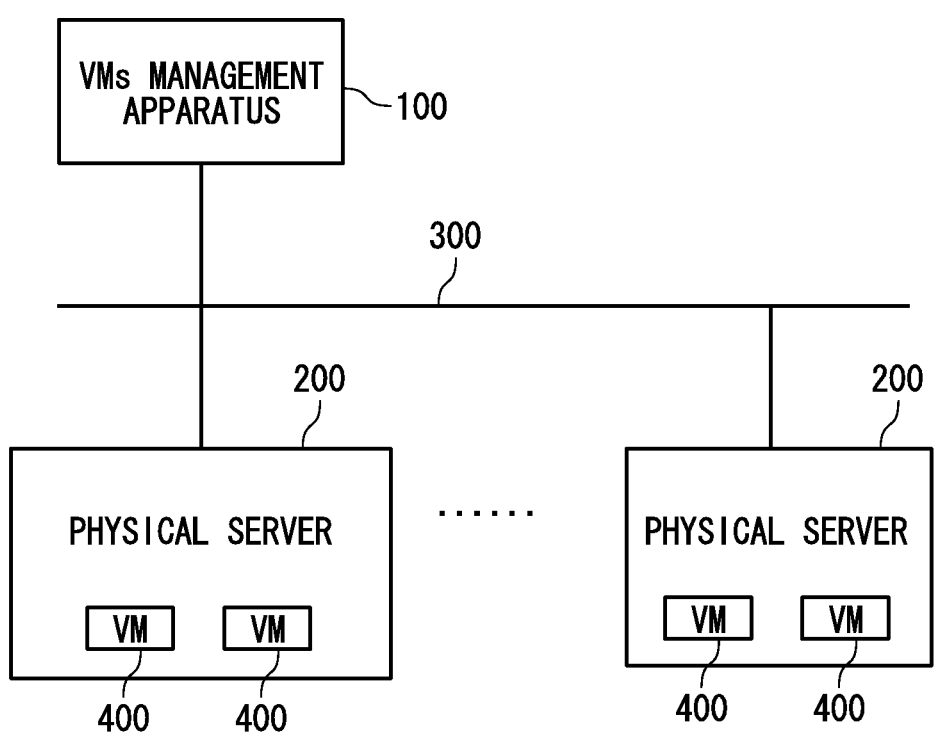
FIG. 1 is a block diagram showing the configuration of a VMs managing system according to an embodiment.

Various embodiments will be hereinafter described with reference to the accompanying drawings. The same elements will be given the same reference signs in the drawings, and redundant description thereon will be omitted.

According to one embodiment of the invention, a virtual machines management apparatus includes a virtual machine controller, a history storage, and a planning module. The virtual machine controller is configured to migrate virtual machines between plural physical servers. The history storage is configured to store, for each set of first virtual machines that were migrated to a same migration destination physical server parallel in time among the virtual machines migrated by the virtual machine controller, history information including a residual resource amount of the migration destination physical server, a sum of resource consumptions of the respective first virtual machines, and migration performance which is determined based on a number of first virtual machines migrated per unit time or a time taken by the first virtual machines to migrate. The planning module is configured to determine as to whether or not it is possible to start migrating a planning target virtual machine, for which a new migration plan is to be created, to a candidate migration destination physical server of the planning target virtual machine at a candidate migration start time based on a residual resource amount of the candidate migration destination physical server, a resource consumption of the planning target virtual machine, a sum of resource consumptions of migration-scheduled virtual machines that are scheduled to start migrating to the candidate migration destination physical server at the candidate migration start time, and the history information.

FIG. 1 is a block diagram showing the configuration of a VMs managing system according to an embodiment.

The VMs managing system according to the embodiment include a VMs management apparatus 100 and plural PSs 200. Each PS 200 includes VMs 400. The VMs management apparatus 100 and the PSs 200 are connected to each other by a network 300. No limitations are imposed on the standard the network 300 follows, and the network 300 may be either wireless or wired.

Figure 2:
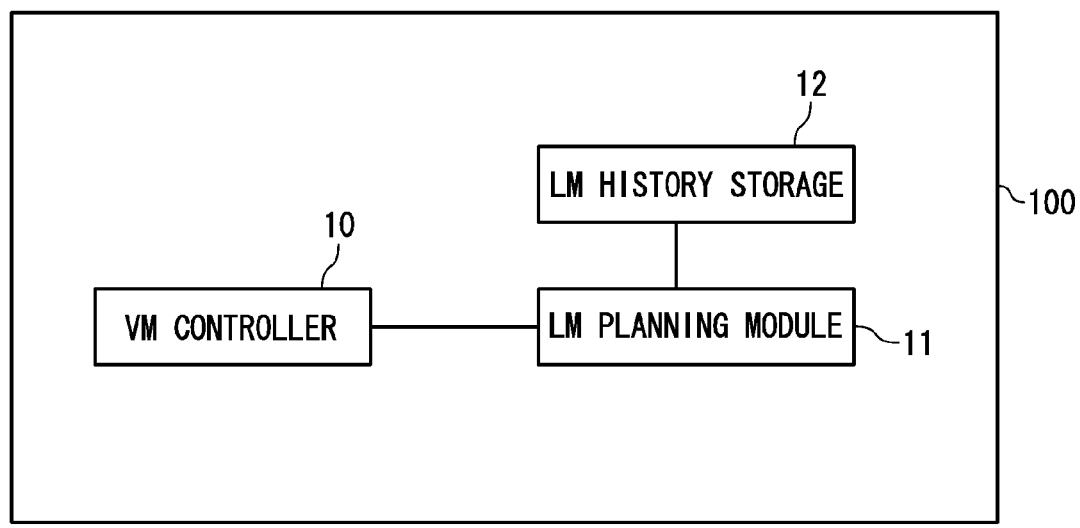
FIG. 2 is a block diagram showing the configuration of a VMs management apparatus according to the embodiment.

FIG. 2 is a block diagram showing the configuration of the VMs management apparatus 100 according to the embodiment.

As shown in FIG. 2, the VMs management apparatus 100 includes a VM controller 10, an LM history storage 11, and an LM planning module 12.

The VM controller 10 migrates a VM 400 running on one of the PSs 200 from one PS 200 to another.

The LM history storage 11 stores, for each set of VMs 400 that were migrated parallel in time to the same destination PS 200 among VMs 400 migrated by the VM controller 10, the history information including a residual resource amount of the destination PS 200, a sum of resource consumptions of the migrated VMs 400, and migration performance that is determined based on the number of VMs 400 migrated per unit time or a time taken by the migration of the VMs 400.

The LM planning module 12 determines as to whether or not it is possible to start migrating a planning target VM 400, for which a migration plan is newly created, to a candidate migration destination PS 200 of the planning target VM 400 at a candidate migration start time based on a residual resource amount of the candidate migration destination PS 200, a resource consumption of the planning target VM 400, and a sum of resource consumptions of migration-scheduled VMs 400 that are scheduled to migrate to the candidate migration destination PS 200 at the candidate migration start time, and the history information.

More specifically, the LM planning module 12 determines as to whether or not it is possible to start migrating the planning target VM 400 to the candidate migration destination PS 200 at the candidate migration start time by comparing first migration performance and second migration performance. The first migration performance is migration performance of such history information that a residual resource amount of the candidate migration destination PS 200 is close to the residual resource amount of the migration destination PS 200 stored in the history storage 11 and the sum of the resource consumptions of the migration-scheduled VMs 400 is close to a sum of resource consumptions of VMs 400 stored in the history storage 11. The second migration performance is migration performance of such history information that the residual resource amount of the candidate migration destination PS 200 is close to the residual resource amount of the migration destination PS 200 stored in the history storage 11 and a sum of (i) a sum of the resource consumptions of the migration-scheduled VMs 400 and (ii) the resource consumption of the planning target VM 400 is close to the sum of resource consumptions of VMs 400 stored in the history storage 11.

The LM planning module 12 determines, for each of all the candidate migration destination PSs 200, as to whether or not it is possible to start migrating the planning target VM 400 to the candidate migration destination PS 200 at the candidate migration start time, decides a migration destination PS 200 of the planning target VM 400 and a migration start time of the planning target VM 400 based on the determination result, and updates the planning target VM 400 to a migration-scheduled VM 400.

If the LM planning module 12 has determined migration destination PSs 200 and migration start times for all respective planning target VMs 400, the VM controller 10 migrates the migration-scheduled VMs 400 to the migration destination PSs 200 in predetermined time slots starting from the respective migration start times determined by the LM planning module 12 parallel in time and stores, in the LM history storage 11, for each combination of a migration start time of the migrated migration-scheduled VM(s) 400 and a migration destination PS 200 for the migrated migration-scheduled VM(s) 400, history information including the residual resource amount of the migration destination PS 200, the sum of resource consumptions of migrated VM(s) 400, and migration performance.

A specific Example of the VMs management apparatus 100 will be described below using an example demand response (DR) control.

The VM controller 10 of the embodiment corresponds to a VM controller 107 of Example. The LM history storage 11 corresponds to a LM history storage 109 of Example. The LM planning module 12 corresponds to an LM planning module 110 of Example.

EXAMPLE

Figure 3:
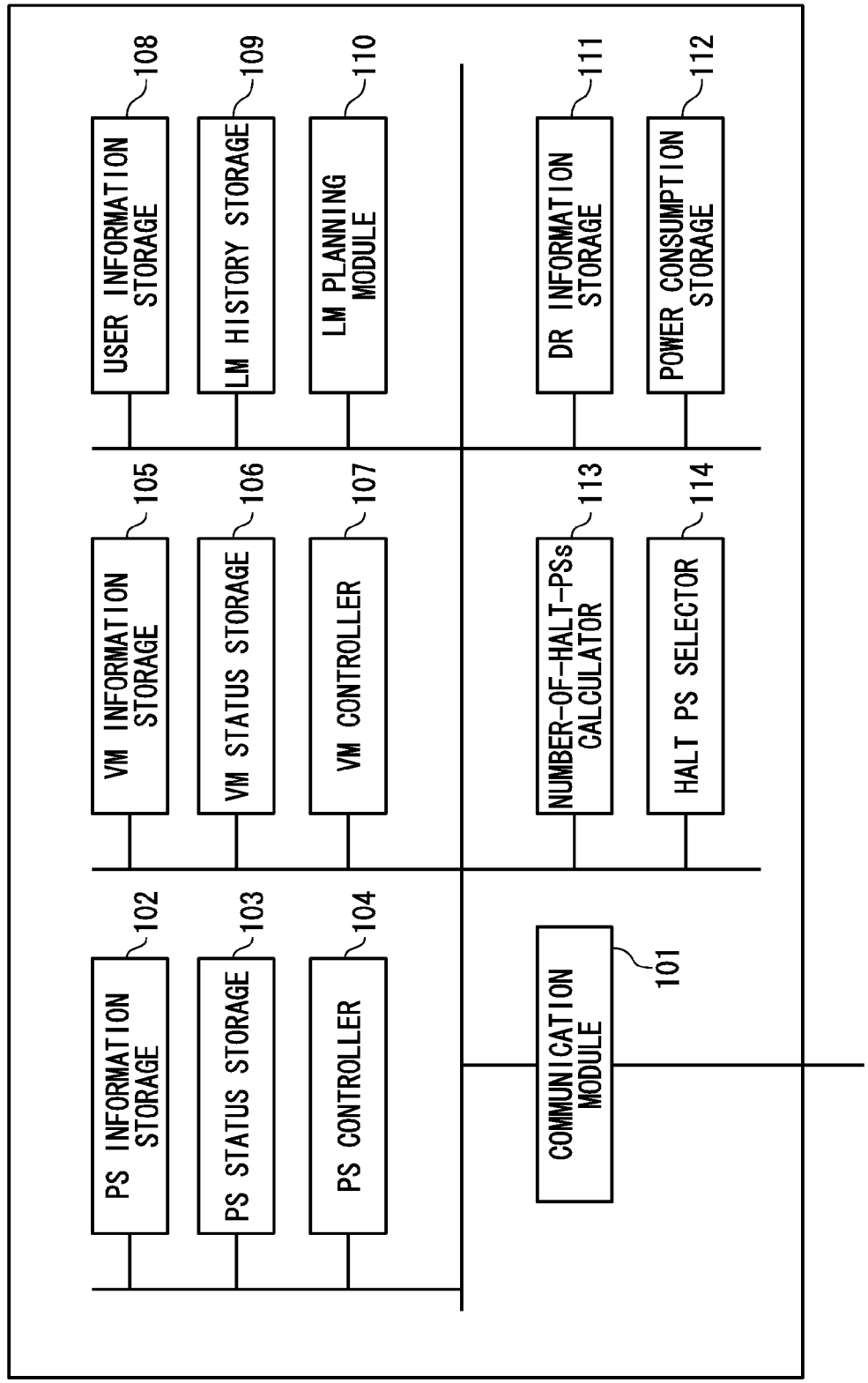
FIG. 3 is a block diagram showing the configuration of a VMs management apparatus 100 according to Example.

FIG. 3 is a block diagram showing the configuration of the VMs management apparatus 100 according to Example.

The VMs management apparatus 100 includes a communication module 101, a PS information storage 102, a PS status storage 103, a PS controller 104, a VM information storage 105, a VM status storage 106, the VM controller 107, a user information storage 108, the LM history storage 109, the LM planning module 110, a DR information storage 111, a power consumption storage 112, a number-of-halt-PSs calculator 113, a halt PS selector 114.

The communication module 101 communicates with the PSs 200 and the VMs 400 in the PSs 200.

The PS information storage 102 stores PS-IDs and performance information of the respective PSs 200 in association with each other. The PS-ID is an ID for unique identification of each PS 200. The performance information of a PS 200 includes, for example, CPU performance information, memory performance information, storage performance information, and network performance information. The memory means a main storage device that stores programs and data, which are necessary when, for example, a CPU processes data, after reading the programs and data from an auxiliary storage device. The storage means the auxiliary storage device which stores programs and data for a long time. The CPU performance information is, for example, information including the number, type, number of cores, and clock frequency (Hz) of a CPU. The memory performance information is, for example, information including a size (bytes) and a bandwidth (bytes/s). The storage performance information is, for example, information including a type (HDD, SSD, MRAM), a size (bytes), an operation speed (bytes/s), and latency (ms). The network performance information includes, for example, a network bandwidth, a standard, and a communication address.

The PS status storage 103 stores, for each PS 200, the PS-ID and PS resource usage information in association with each other. The PS resource usage information is acquired from each PS 200 by the communication module 101. The PS resource usage information is, for example, information including a measurement time, a power state (on/off) of the PS 200, a CPU use amount (or CPU use rate), the number of times of use of a context switch (CS), a memory use amount, a swap generation amount, a storage use amount, a storage access amount, a network use amount, and a list of IDs of VMs 400 in operation. The context switch is a switching process of storing a state of a process (context) of a certain program and switching to a process of another program or restoring a stored state of a process and restarting the program so that plural programs can share a single CPU. The swap generation amount is a read or write data amount of a context of a certain program stored in the memory when the context is read from or written to the storage. FIG. 4 shows an example of various kinds of information stored in the PS status storage 103.

The PS controller 104 powers on/off the PSs 200 via the communication module 101. Each PS 200 has such a function that its power can be controlled over a network.

The VM information storage 105 stores, for each VM 400, a VM-ID, a user ID of a user of the VM 400, a service type (a type of service provided by using the VM 400), allocated CPU performance information (performance information of a CPU allocated to the VM 400), allocated memory performance information (performance information of a memory allocated to the VM 400), allocated storage performance information (performance information of a storage allocated to the VM 400), and allocated network performance information (performance information of a network allocated to the VM 400). The VM-ID is an ID for unique identification of each VM 400. The user ID is an ID for unique identification of the user of the VM 400. Examples of the service type include a web server, an application server, a DB server, a load balancer, a storage server, and the like. The allocated CPU performance information includes, for example, the number, type, number of cores, and clock frequency (Hz) of the CPU. The allocated memory performance information includes, for example, a size (bytes) and a bandwidth (bytes/s). The allocated storage performance information includes, for example, a type, a size (bytes), an operation speed (bytes/s), and latency (ms). The allocated network performance information includes, for example, a network bandwidth, a standard, and a communication address.

The VM status storage 106 stores, for each VM 400, the VM-ID and VM resource usage information in association with each other. The VM status storage 106 grasps the VM resource usage information via the communication module 101 and store them. The VM-ID is the ID for unique identification of each VM 400. For example, the VM resource usage information includes, for example, a measurement time, a power state (on/off) of the VM 400, a CPU use amount (or CPU use rate), a context switch (CS) frequency, a memory use amount, a swap generation amount, a storage use amount, a storage access amount, and a network use amount. FIG. 5 shows an example of various kinds of information stored in the VM status storage 106.

The LM history storage 109 stores history information relating to live migration that was executed in past. For example, the live migration history information include, for each set of VMs 400 that were live-migrated parallel in time to the same PS 200, a residual resource amount of the LM destination PS 200, a resource consumption of a live-migrated VM 400 (or a sum of resource consumptions of plural VMs 400 live-migrated simultaneously), LM performance, and LM success/failure. The residual resource amount of the LM destination PS 200 is its residual resource amount at the start of the live migration. The LM performance is, for example, a live migration speed which can be represented by the number of VMs 400 which complete live migration per second (unit is the number of VMs/second). Alternatively, the LM speed may be represented by a time taken to live-migrate one VM 400 (or an average of times taken to live-migrate plural VMs 400). The LM performance may be the number of VMs 400 which has completed live migration rather than the LM speed. VMs 400 that were live-migrated parallel in time to the same PS 200 may have the same live migration start time. In such a case, the LM history storage 109 may store the history information for each set of VMs 400 that have the same live migration start time and that were live-migrated to the same PS 200. FIG. 6 shows an example of various kinds of information stored in the LM history storage 109.

A relationship between LM performance and a combination of a residual resource amount and a VM resource consumption at a time when live migration is executed can be obtained from the information stored in the LM history storage 109. In FIG. 6, each resource-related quantity is represented by a one-dimensional value. There are various methods for converting quantities relating to plural resources such as a CPU and a memory into a one-dimensional value. It is assumed that in this embodiment, resource-related quantities are calculated according to the following Equations (1) to (4), respectively. However, the calculation methods are not limited to the following methods. Also, the resource selection methods are not limited to the following methods, either.

$$\text{(Resource amount of PS 200)} = \text{(number of CPUs)} \times A + \text{(memory size)} \times B + \text{(storage size)} \times C + \text{(network bandwidth)} \times D \qquad (1)$$

In Equation (1), A, B, C, and D denote preset coefficients one of which may have a value "0."

$$\text{(Resource consumption of PS 200)} = \text{(number of CPUs)} \times \text{(CPU use rate)} \times A + \text{(memory consumption)} \times B + \text{(storage consumption)} \times C + \text{(network consumption)} \times D \qquad (2)$$

$$\text{(Resource amount of VM 400)} = \text{(number of allocated CPUs)} \times A + \text{(allocated memory size)} \times B + \text{(allocated storage size)} \times C + \text{(allocated network bandwidth)} \times D \qquad (3)$$

$$\text{(Resource consumption of VM 400)} = \text{(number of allocated CPUs)} \times \text{(CPU use rate)} \times A + \text{(memory consumption)} \times B + \text{(storage consumption)} \times C + \text{(network consumption)} \times D \qquad (4)$$

A residual resource amount of a PS 200 can be calculated according to the following Equation (5):

$$\text{(Residual resource amount of PS 200)} = \text{(resource amount of PS 200)} - \text{(sum of allocated resource amounts of all VMs 400 operating on PS 200)} \quad (5)$$

A residual resource amount of a PS 200 may also be calculated by a method other than the method using Equation (5). For example, a residual resource amount of a PS 200 may be calculated according to an equation $$\text{(Residual resource amount of PS 200)} = \text{(resource amount of PS 200)} - \text{(resource consumption of PS 200)}.$$

That is, where a resource amount is calculated based on the performance of CPUs, memory, and storage of PS 200, the residual resource amount of PS 200 may be calculated as a difference between the resource amount and consumption of the PS resources used for the calculation of the resource amount or as a difference between the resource amount and a total sum of resource amounts of all VMs 400 operating on the PS 200. Also, resource consumption may be consumption calculated for resources that are used for calculation of a resource amount.

The user information storage 108 stores, for each of users of the VMs 400, a user ID, a user name, user authentication information, and a party to which the user belongs.

The DR information storage 111 stores received DR information. Specifically, the DR information storage 111 stores a DR information ID, a time slot, and a power unit price. The DR information ID is an ID for unique identification of DR information. FIG. 7 shows an example of information stored in the DR information storage 111.

The power consumption storage 112 stores power consumption of each PS 200. Specifically, the power consumption storage 112 stores a PS-ID, a time slot, and a power consumption.

The number-of-halt-PSs calculator 113 determines the number of PSs 200 that should be halted to prevent the electricity charge from becoming unduly high. The number of PSs 200 that should be halted is determined taking into consideration power unit prices presented in the received DR information and power consumptions of the respective PSs 200.

The halt PS selector 114 selects PSs 200 to be halted according to the number determined by the number-of-halt-PSs calculator 113. PSs 200 selected by the halt PS selector 114 are referred to as halt-scheduled PSs. There are various methods for selecting halt-scheduled PSs. A first method is a method of selecting halt-scheduled PSs randomly from PS 200 in operation. A second method is a method of selecting halt-scheduled PSs in ascending (or descending) order of the number of VMs 400 operating on the PS 200. A third method is a method of selecting halt-scheduled PSs in ascending (or descending) order of the resource consumption percentage. Any of the first to third methods may be used, and even another method may be used.

The LM planning module 110 determines LM destination PSs 200 and LM start times for each group of VMs (referred to as LM-scheduled VMs) whose live migration has become necessary. The LM destination PS 200 is a destination physical server 200 of live migration. There are various criteria as to from which LM-scheduled VM it is started to determine LM destination PSs 200 and LM start times. A first criterion is making determinations for LM-scheduled VMs in descending (or ascending) order of the resource consumption. A second criterion is making determinations for LM-scheduled VMs in descending (or ascending) order of the allocated resource amount. A third criterion is making determinations for LM-scheduled VMs in descending (or ascending) order of the resource consumption of the PS 200 on which the VM 400 is operating. Any of the first to third criteria may be used, and even another criterion may be used.

The LM planning module 110 determines LM destination PSs 200 and LM start times so that the total LM time (i.e., a time taken to live-migrate all of plural VMs 400) becomes short. Basically, the LM planning module 110 selects, as LM destination PSs 200, PSs 200 whose resource consumptions have sufficient margins and have been selected small numbers of times. If the LM performance will be enhanced, the LM planning module 110 determines an LM start time so that plural VMs 400 will be live-migrated simultaneously to a certain LM destination PS 200. Whether or not the LM performance will be enhanced by a simultaneous live migration is determined based on the information stored in the LM history storage 109 and the residual resource amount of the PS 200 and the resource consumptions of the VMs 400 at the time of planning.

Also, the LM planning module 110 may determine LM start times so that VMs 400 of the same user will not be live-migrated in the same time slot. The processing performance of a VM 400 lowers during its live migration. Therefore, if VMs 400 of a certain user are live-migrated in the same time slot, the total processing performance of the VMs 400 of the user (user system performance) lowers to a large extent in a short period. Reduction of the user system performance of a certain user can be distributed in time by live-migrating VMs 400 of the user in different time slots. For example, the LM planning module 110 compares users of LM planning target VMs 400 with users of VMs 400 whose LM start times have already been determined by, for example, referring to the user information storage 108, and creates a plan in which the LM start time of an LM-start-time-determined VM 400 of the same user as an LM planning target VM 400 is not employed as an LM start time of the LM planning target VM 400.

Furthermore, where types of services provided by VMs 400 are known, LM start times may be determined so that VMs that provide the same type of service are not live-migrated in the same time slot. For example, it is assumed that a certain user has constructed a system which uses plural web server VMs, plural application server VMs, and plural DB server VMs. In this case, even if high only the performance of the web server VMs is, the system performance is low as long as the performance of the DB server VMs are low. Reduction of the user system performance can be distributed in time by live-migrating VMs 400 that provide the same type of service in different time slots. The LM planning module 110 compares types of services provided by LM planning target VMs 400 with types of services provided by VMs 400 whose LM start times have already been determined by, for example, referring to the VM information storage 105, and creates a plan in which the LM start time of a VM 400 that provides the same type of service as an LM planning target VM 400 is not employed as an LM start time of the LM planning target VM 400.

Details of other types of processing performed by the LM planning module 110 and the like will be described later.

The VM controller 107 cooperates with the PSs 200 to generate, delete, activate, or halt a VM(s) 400, change the resource allocation amount of the VM(s) 400, or perform other processing on the VM(s) 400. The VM controller 107 live-migrates VMs 400 according to an LM plan created by the LM planning module 110. After live migrating, the VM controller 107 stores a time taken by the live migration, a residual resource amount of an LM destination PS 200, a resource consumption of the VMs 400, and LM performance in the LM history storage 109. In this manner, the information stored in the LM history storage 109 is updated every time VMs 400 are live-migrated.

When VMs 400 have been live-migrated according to an LM plan, the VM controller 107 may temporarily increase the resource allocation amount of a VM(s) 400 that have not been migrated yet. In the environment assumed in the embodiment, a VM(s) 400 may be migrated to a PS 200 that does not have very large resources to spare, in which case the post-migration performance of the VM 400 lowers. On the other hand, the resource margins of halt-scheduled PSs 200 increase as live migrations proceed. Reduction of the user system performance of a system under execution of an LM plan can be suppressed by allocating resource margins produced by live migrations to VMs 400 that that have not been migrated yet.

An operation of the VMs management apparatus 100 will be described below.

At first, an overall operation of the VMs management apparatus 100 will be described.

Figure 8:
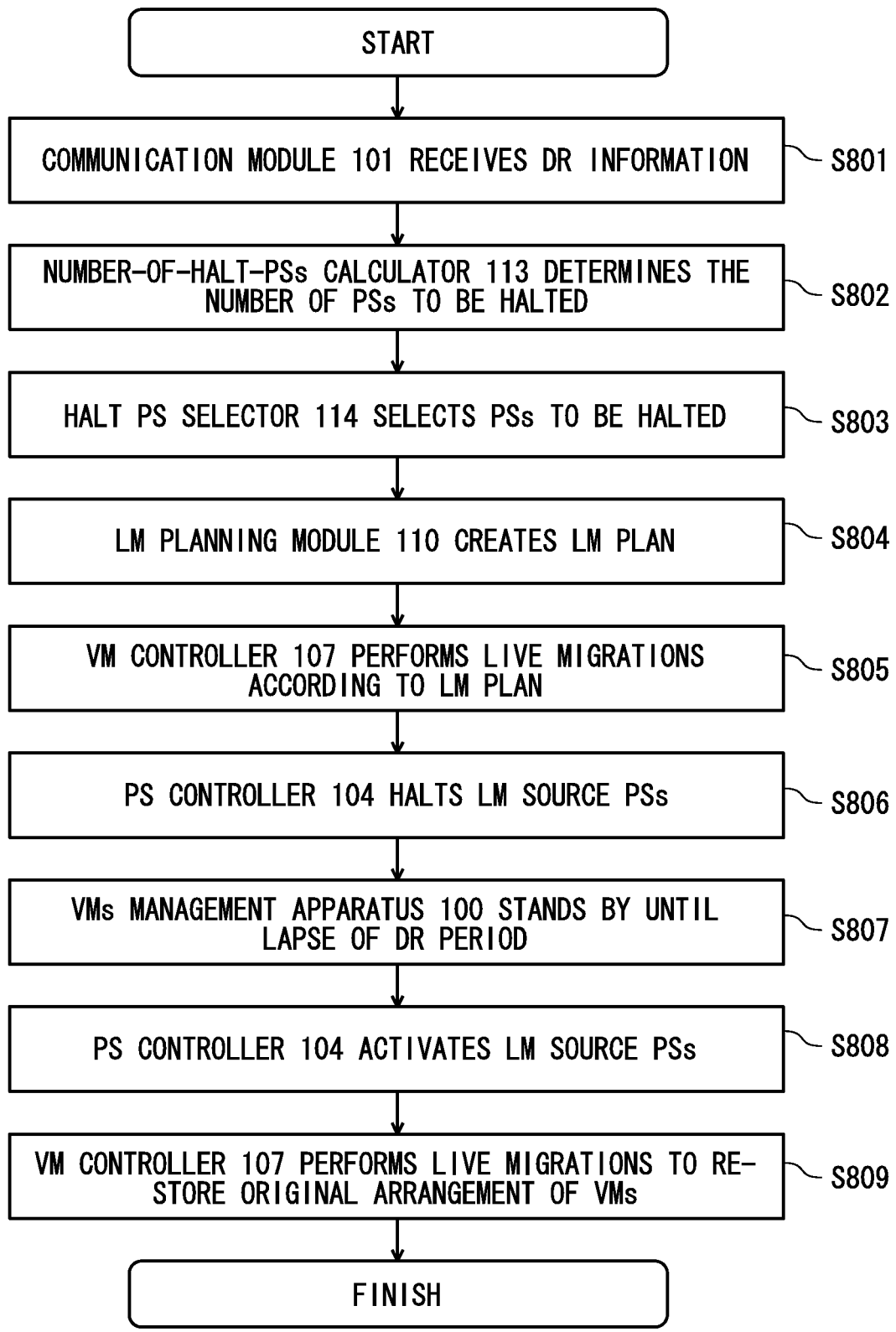
FIG. 8 is a flowchart outlining an overall operation of the VMs management apparatus 100.

FIG. 8 is a flowchart showing the overall operation of the VMs management apparatus 100.

At first, at step S801, the communication module 101 receives DR information and records it in the DR information storage 111. At step S802, the number-of-halt-PSs calculator 113 determines the number of PSs 200 to be halted. At step S803, the halt PS selector 114 selects PSs 200 to be halted. At step S804, the LM planning module 110 creates an LM plan. At step S805, the VM controller 107 performs live migrations according to the LM plan of VMs 400. At step S806, the PS controller 104 halts LM source PSs 200 (physical servers 200 from which VMs 400 are to be migrated). At step S807, the VMs management apparatus 100 stands by until a lapse of a DR period. At step S808, the PS controller 104 activates the LM source PSs 200. At step S809, the VM controller 107 performs live migrations to restore the original arrangement of the VMs 400.

Among the steps shown in FIG. 8, the steps executed by the number-of-halt-PSs calculator 113, the LM planning module 110, the VM controller 107, and the PS controller 104 will be described in detail below.

Next, an operation of the number-of-halt-PSs calculator 113 will be described.

At first, the number-of-halt-PSs calculator 113 refers to newly recorded DR information and recognizes a time slot and a power unit price. Then the number-of-halt-PSs calculator 113 compares the power unit price of the DR information with an ordinary power unit price and calculates their ratio (see Equation (6)).

(Power unit price ratio)=(power unit price of DR information)/(ordinary power unit price)     (6)

The number-of-halt-PSs calculator 113 employs the reciprocal of the power unit price ratio as a percentage of PSs 200 to be halted (see Equation (7)).

(Percentage of PSs to be halted)=1/(power unit price ratio)     (7)

The number-of-halt-PSs calculator 113 calculates the number of PSs 200 to be halted by multiplying the total number of PSs 200 by the percentage of PSs 200 to be halted (see Equation (8)).

(The number of PSs to be halted)=(total number of PSs)×(percentage of PSs to be halted)     (8)

The number-of-halt-PSs calculator 113 rounds off the number of PSs 200 to be halted into an integer. If the following Equation (9)

(number of PSs to be halted as rounded off)=(total number of PSs)     (9)

holds, the number-of-halt-PSs calculator 113 modifies the number of PSs 200 to be halted according to the following Equation (10):

(Number of PSs to be halted)=(total number of PSs)−1     (10)

The number-of-halt-PSs calculator 113 passes the information indicating "the number of PSs 200 to be halted" to the halt PS selector 114. As described above, the halt PS selector 114 selects PSs 200 to be halted.

Figure 9:
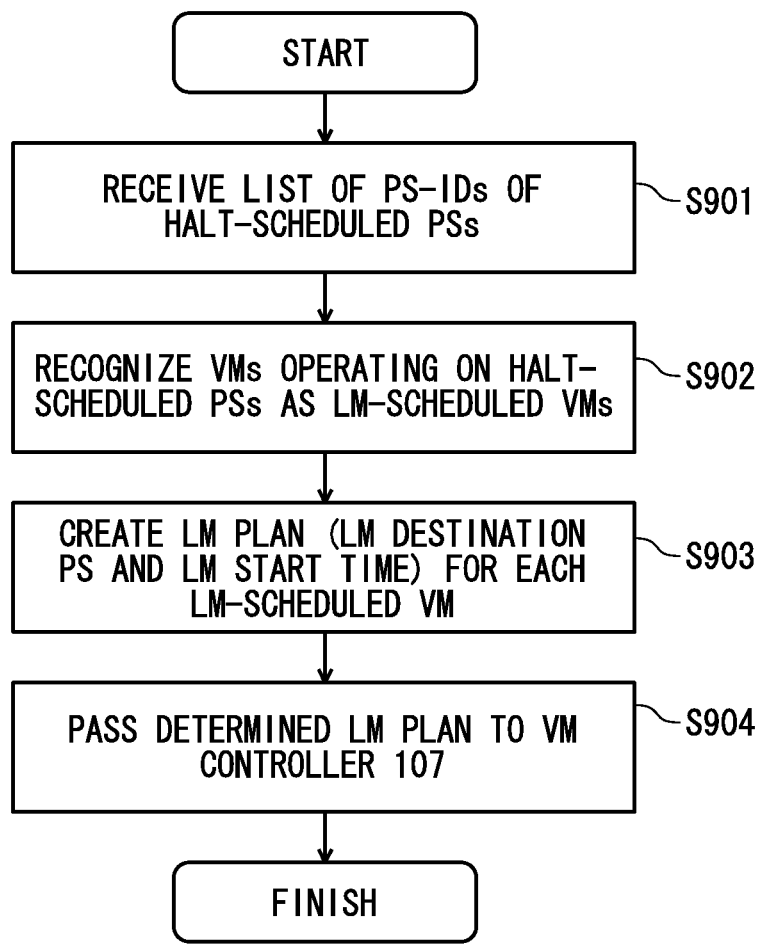
FIG. 9 is a flowchart showing how an LM planning module 110 operates.

Next, an operation of the LM planning module 110 will be described in detail with reference to FIG. 9.

At step S901, the LM planning module 110 receives a PS-ID list of halt-scheduled PSs 200 (PSs 200 that are scheduled to be powered off) from the halt PS selector 114. At step S902, the LM planning module 110 employs the PSs other than the halt-scheduled PSs 200 as candidate LM destination PSs 200 (physical servers 200 that can be selected as LM destination PSs 200). Also, the LM planning module 110 employs VMs 400 operating on the halt-scheduled PSs 200 as LM-scheduled VMs 400 (VMs 400 that are scheduled to be live-migrated). At step S903, the LM planning module 110 creates an LM schedule (an LM destination PS 200 and an LM start time) for each LM-scheduled VM 400. At step S904, the LM planning module 110 passes the thus-determined LM plans to the VM controller 107.

Figure 10:
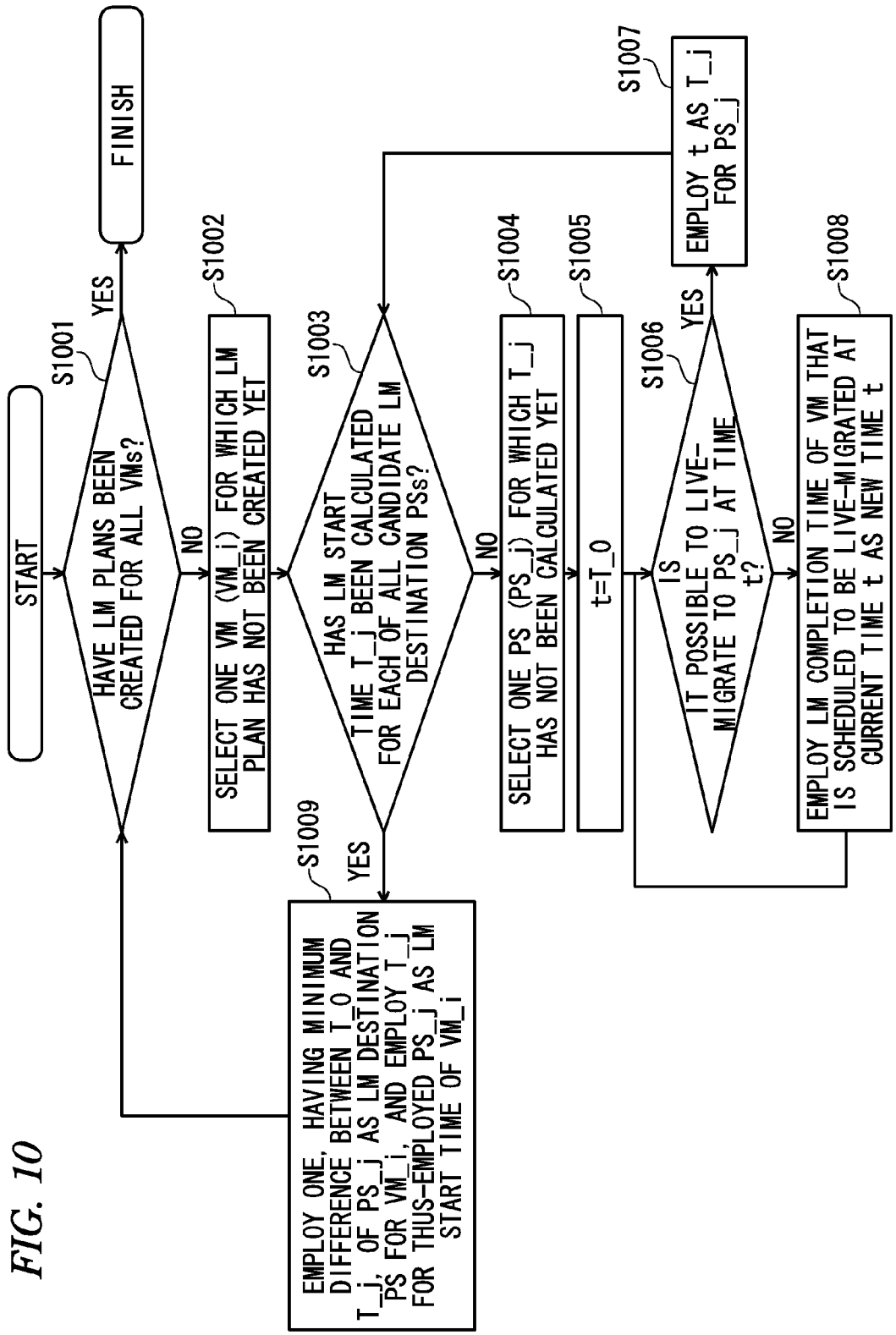
FIG. 10 is a flowchart showing a process for creating an LM plan.

FIG. 10 is a flowchart of an LM plan creation process.

An operation flow for creating an LM plan for each LM-scheduled VM will be described with reference to FIG. 10. An LM start time will be represented by a relative time with respect to an origin time T_0.

At step S1002, one VM 400 for which an LM plan has not been created yet is selected from LM-scheduled VMs 400 and is given a symbol VM_i. The process is terminated if the LM plans have been created for all the LM-scheduled VMs 400 (Yes at step S1001).

At step S1004, one PS 200 for which a time T_j (LM start time) at which the VM_i can be live-migrated has not been calculated yet is selected from candidate LM destination PSs 200 and given a symbol PS_j. The process proceeds to step S1009 if time T_j has been determined for every the candidate LM destination PS 200 (Yes at step S1003).

At step S1005, T_0 is substituted into time t to start calculation of the LM start time T_j for PS_j.

At step S1006, it is determined as to whether or not VM_i can be live-migrated to PS_j at time t. A specific determination method will be described later. If VM_i can be live-migrated to PS_j at time t (Yes at step S1006), time t is employed as the LM start time T_j at step S1007. Then the process returns to step S1003.

On the other hand, if VM_i cannot be live-migrated to PS_j at time t (No at step S1006), it means that there exists VM_f that has already been scheduled to live-migrate to PS_j at time t. In this case, at step S1008, an LM completion time of VM_f is employed as a new time t. Then, the process returns to step S1006. The LM completion time of VM_f can be calculated by referring to the information stored in the LM history storage 109. For example, it can be predicted based on a resource amount (or consumption) of VM_f and the information stored in the LM history storage 109. If there is a relationship (e.g., proportional relationship) between the VM resource amount (consumption) and the time taken by a live migration, the LM completion time of VM_f can be calculated only based on its resource amount (or consumption).

At step S1009, PS_j having a minimum difference between T_0 and T_j is finally employed as an LM destination PS 200 of VM_i. And, the LM start time T_j for the thus-employed PS_j is finally employed as an LM start time of VM_i.

Next, a method for determining as to whether or not VM_i can be live-migrated to PS_j at time t will be described.

Figure 11:
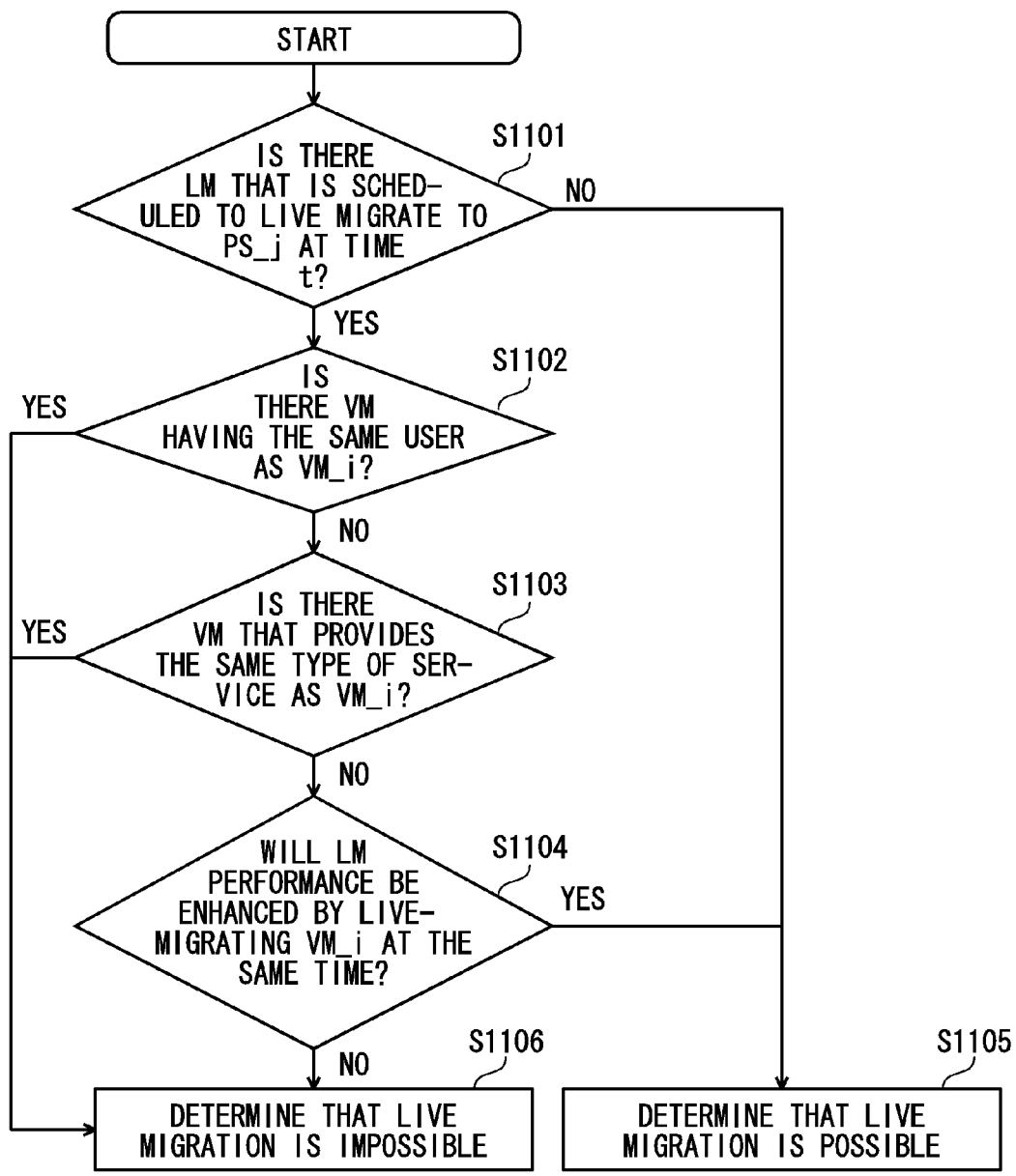
FIG. 11 illustrates a process according to which to determine as to whether or not VM_i can be live-migrated to PS_j at time t.

FIG. 11 shows a process for determining as to whether or not VM_i can be live-migrated to PS_j at time t.

Figure 12:
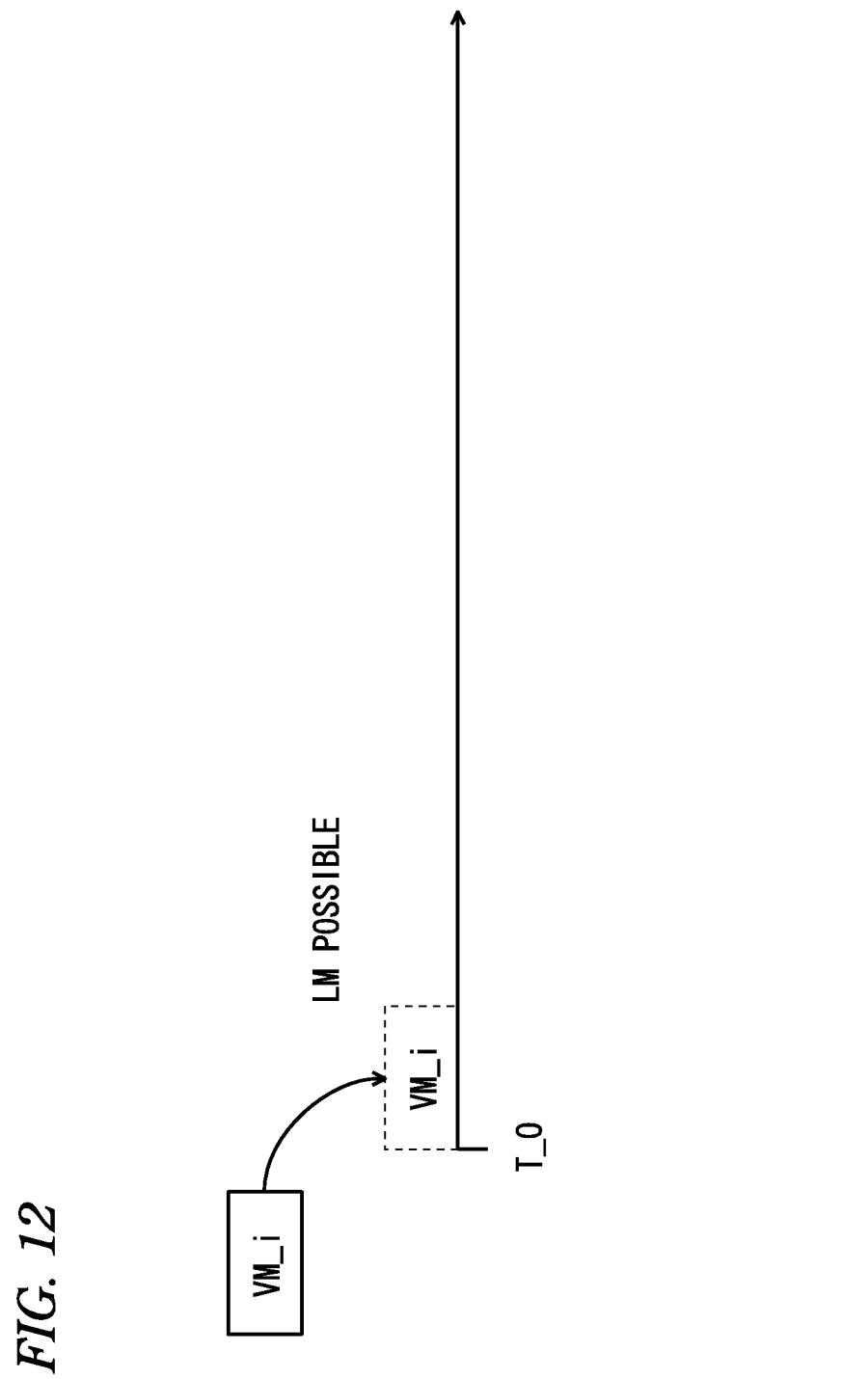
FIG. 12 shows an example in which there is no VM 400 that is scheduled to live-migrate to PS_j at time T_0.

If there is no VM 400 that is scheduled to start a live migration to PS_j at time t (No at step S1101), it is determined at step S1105 that VM_i can be live-migrated to PS_j at time t. FIG. 12 shows an example in which there is no VM 400 that is scheduled to start a live migration to PS_j at time t=T_0. In this case, T_j is determined to be T_0.

On the other hand, if there exists VM_f that is scheduled to start a live migration to PS_j at time t (Yes at step S1101), it is checked at step S1102 as to whether or not VM_f and VM_i have a common user. If VM_f and VM_i have a common user (Yes at step S1102), it is determined at step S1106 that VM_i cannot be live-migrated to PS_j at time t.

If the determination result at step S1102 is negative (No), the process proceeds to step S1103. At step S1103, it is checked whether or not VM_f and VM_i provide the same type of service (web server, db server, or the like). If VM_f and VM_i provide the same type of service (Yes at step S1103), it is determined at step S1106 that VM_i cannot be live-migrated to PS_j at time t.

At step S1104, it is considered as to whether or not the LM performance will be enhanced by live-migrating VM_i at the same time. If it is expected that the LM performance will be enhanced or remain the same (Yes at step S1104), it is determined at step S1105 that VM_i can be live-migrated to PS_j at time t. If it cannot be determined as to whether or not the LM performance will be enhanced (Yes at step S1104), it is also determined at step S1105 that VM_i can be live-migrated to PS_j at time t. If it is expected that the LM performance will degrade (No at step S1104), it is determined at step S1106 that VM_i cannot be live-migrated to PS_j at time t.

Whether or not the LM performance will be enhanced by live-migrating VM_i at the same time is determined by using the following Inequality (11):

(LM performance in the case where VM_$i$ is live-migrated at the same time)≥(LM performance in the case where VM_$i$ is not live-migrated at the same time)     (11)

The LM performance will be enhanced by live-migrating VM_i at the same time if Inequality (11) holds, and will not be enhanced even if VM_i is live-migrated at the same time if Inequality (11) does not hold. However, whether or not the LM performance will be enhanced cannot be determined unless respective LM performance values corresponding to the left side and the right side of Inequality (11) are calculated.

Three information are necessary to calculate the respective LM performance values corresponding to the left side and the right side of Inequality (11). First information is a residual resource amount of PS_j (LM destination PS 200). Second information is a sum of resource consumptions of LM-scheduled VMs 400 each having PS_j as an LM destination PS 200. Third information is a resource consumption of VM_i.

These three information can be obtained from the information stored in the PS information storage 102, the information stored in the PS status storage 103, and the information stored in the VM status storage 106.

By referring to the LM history storage 109, LM history items in each of which a difference between a value of the column "residual resource amount of LM destination PS" and a value of the first information is smaller than or equal to a threshold value 1 are acquired. From among the thus-found LM history items, ones in each of which a difference between a value of the column "resource consumption of live-migrated VMs" and a value of the second information is smaller than or equal to a threshold value 2 are acquired. The LM performance of the LM history item having the minimum difference is employed as a value for the right side of Inequality (11). It is assumed that the threshold value 1 and the threshold value 2 are set in advance.

Furthermore, the LM history items in each of which the difference between a value of the column "residual resource amount of LM destination PS" and the value of the first information is smaller than or equal to the threshold value 1 are acquired. From among the thus-found LM history items, ones in each of which the value of the column "resource consumption of live-migrated VMs" and a sum of a value of the "second information and a value of the third information" is smaller than or equal to the threshold value 2 are acquired. The LM performance of the LM history item having the minimum difference is employed as a value for the left side of Inequality (11).

The calculation in this manner makes it possible to determine as to whether or not the LM performance will be enhanced.

Figure 13:
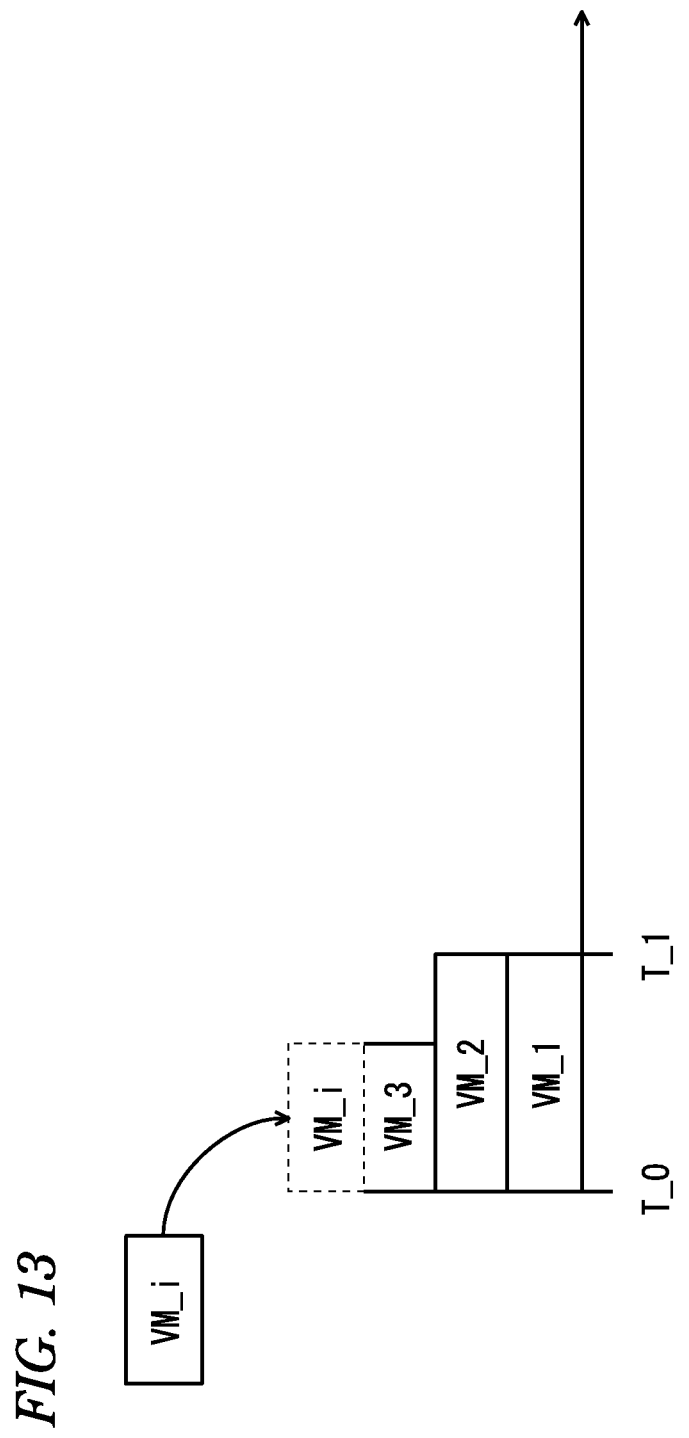
FIG. 13 shows an example in which there exist VMs 400 that are scheduled to live-migrate to PS_j at time T_0.

FIG. 13 shows an example in which there exist VMs 400, (VM_1, VM_2, and VM_3) that are scheduled to live-migrate to PS_j at time T_0. Reference sign T_1 represents a time at which a live migration of VM_1 and VM_2 will complete. In this case, as described above, it is determined as to whether or not further live migration of VM_i at the same time will enhance the LM performance.

Figure 14:
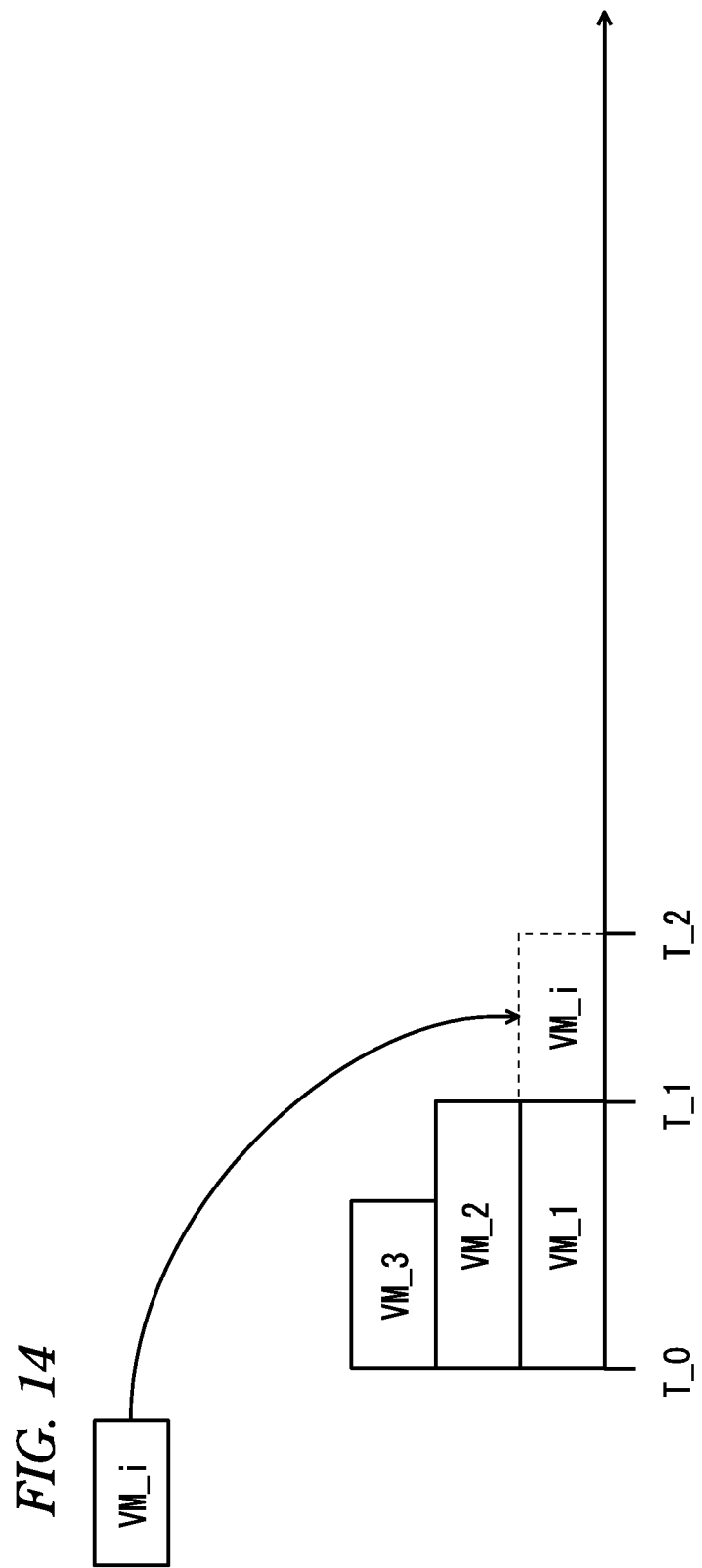
FIG. 14 shows an example in which there is no VM 400 that is scheduled to live-migrate to PS_j at time T_1.

In the example of FIG. 13, if it is determined that the LM performance will degrade, it is further determined as to whether or not VM_i can be live-migrated at time T_1 in a manner shown in FIG. 14.

FIG. 14 shows an example in which there is no VM 400 that is scheduled to live-migrate to PS_j at time T_1.

In the example of FIG. 14, since there is no VM 400 that is scheduled to live-migrate to PS_j at time T_1, it is determined that VM_i can be live-migrated at time T_1.

In FIG. 11, an order of the three steps S1102, S1103, and S1104 which serve to determine as to whether or not a live migration is possible may be changed. Whether or not a live migration is possible may be determined by one or two of the three steps S1102, S1103, and S1104. For example, only step S1104 may be used.

Figure 15:
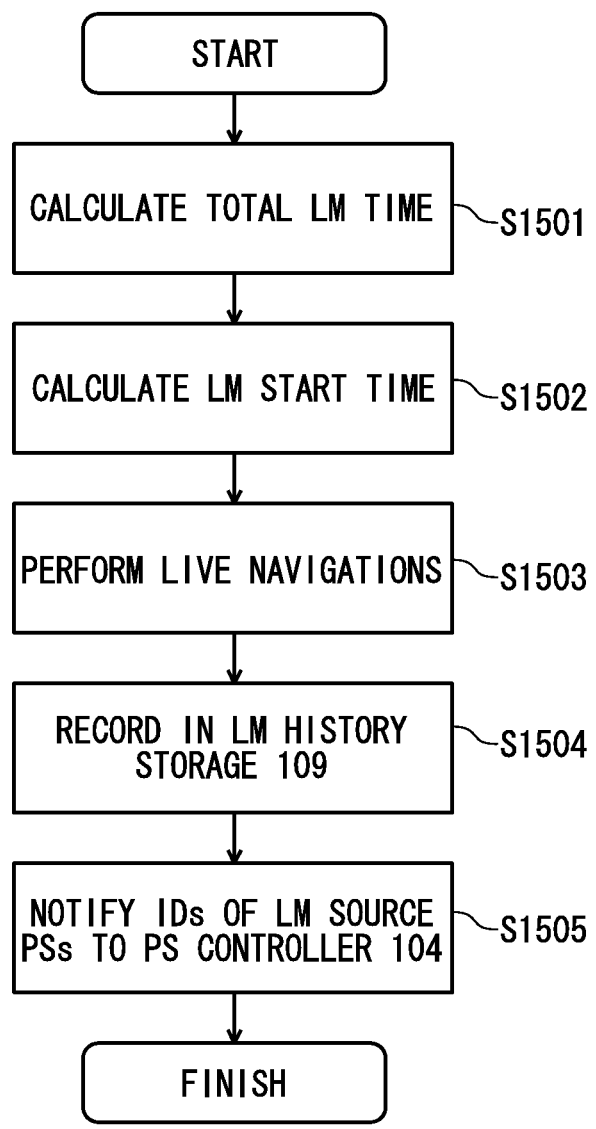
FIG. 15 is a flowchart showing how a VM controller 107 operates.

Next, an operation of the VM controller 107 will be described. FIG. 15 is a flowchart showing how the VM controller 107 operates.

At first, at step S1501, a total LM time is calculated based on an LM plan created by the LM planning module 110. The total LM time is a difference between a last LM completion time and T_0.

At step S1502, an actual LM start time is calculated according to Equation (12):

$$\text{(Actual LM start time)} = \text{(start time of DR time slot)} - \text{(total LM time)} \qquad (12)$$

At step S1503, the calculated actual LM start time is set as an origin time T_0 and live migrations are performed according to the LM plan. The VM controller 107 need not always cause all VMs 400 whose LM start time is set at, for example, T_0 to start migrating exactly at T_0. The VM controller 107 may cause those VMs 400 to start and complete migrations in a predetermined time slot starting from T_0 (e.g., a time slot from T_0 to T_ 1).

At step S1504, every time a live migration is completed, information such as a resource consumption of live-migrated VMs 400, LM performance (e.g., the number of VMs 400 migrated per second), whether or not a live migration error occurred, and a residual resource amount of the LM destination PS 200 are recorded in the LM history storage 109.

At step S1505, an ID of an LM source PS 200 for each VM 400 is notified to the PS controller 104.

Next, an operation of the PS controller 104 will be described. AT first, upon completion of all live migrations, the PS controller 104 powers off all halt-scheduled PSs 400. The PS controller 104 stands by until a lapse of a DR period. Upon a lapse of the DR period, the PS controller 104 powers on all the halt-scheduled PSs 400. After the activation of those PSs 400, the PS controller 104 live-migrates the VM 400 concerned to restore their original arrangement. At this time, the PS controller 104 uses "the IDs of the LM source PSs 200" received from the VM controller 107.

Although the above embodiment is directed to the case of preventing the electricity charge from becoming unduly high, the uses of the concepts of the embodiments are not limited thereto. The concepts of the embodiments are applicable in situations where it is desired to live-migrate many VMs quickly. For example, the VMs management apparatus 100 can be applied to a case where a malfunction or a failure of a PS is detected and it is desired to live-migrate VMs to other PSs.

Live migration methods are classified into a method in which only the memory of each VM is migrated and a method in which both of the memory and the storage of each VM are migrated. The concepts of the embodiments can be applied to the both methods. However, where only the memory of each VM is migrated, it is necessary to separately provide a shared storage server for allowing PSs to share storage information of a VM.

When plural VMs are live-migrated, the time taken by a live migration can be shortened by live-migrating as many VMs as possible parallel at a lowest probability of occurrence of a failure.

For example, the VMs management apparatus 100 can be implemented by using a general-purpose computer as basic hardware. That is, the communication module 101, the PS information storage 102, the PS status storage 103, the PS controller 104, the VM information storage 105, the VM status storage 106, the VM controller 107, the user information storage 108, the LM history storage 109, the LM planning module 110, the DR information storage 111, the power consumption storage 112, the number-of-halt-PSs calculator 113, and the halt PS selector 114 may be implemented by causing a processor incorporated in the computer to execute programs. In this case, the communication module 101, the PS information storage 102, the PS status storage 103, the PS controller 104, the VM information storage 105, the VM status storage 106, the VM controller 107, the user information storage 108, the LM history storage 109, the LM planning module 110, the DR information storage 111, the power consumption storage 112, the number-of-halt-PSs calculator 113, and the halt PS selector 114 may be implemented by installing the programs in the computer in advance or installing the programs in the computer when necessary by storing the programs in a storage medium such as a CD-ROM or delivering the programs over a network. It is also possible to implement the PS information storage 102, the PS status storage 103, the VM information storage 105, the VM status storage 106, the user information storage 108, the LM history storage 109, the DR information storage 111, and the power consumption storage 112 by utilizing, as appropriate, a memory or a hard disk drive incorporated in or externally connected to the computer, such a storage device as a CD-R, CD-RW, a DVD-RAM, or a DVD-R.

Although the embodiments have been described above, they are just examples and should not be construed as restricting the scope of the invention. The embodiments may be practiced in various other forms, and a part of them may be omitted, replaced by other elements, or changed in various manners without departing from their spirit and scope. Such modifications are also included in the scope of the embodiments and their equivalents.

DESCRIPTION OF REFERENCE SIGNS

100: VMs management apparatus
101: Communication module
102: PS information storage
103: PS status storage
104: PS controller
105: VM information storage
106: VM status storage
10, 107: VM controller
108: User information storage
11, 109: LM history storage
12, 110: LM planning module
111: DR information storage
112: Power consumption storage
113: Number-of-halt-PSs calculator
114: Halt PS selector
200: PS (physical server)
300: Network
400: VM (virtual machine).

What is claimed is:

1. A virtual machine management apparatus comprising:
   a virtual machine controller configured to migrate virtual machines between plural physical servers;
   a history storage configured to store, for each set of first virtual machines that were migrated to a same migration destination physical server parallel in time among the virtual machines migrated by the virtual machine controller, history information including
      a residual resource amount of the migration destination physical server,
      a sum of resource consumptions of the respective first virtual machines, and
      migration performance which is determined based on a number of first virtual machines migrated per unit time or a time taken by the first virtual machines to migrate; and
   a planning module, implemented by a processor, configured to determine as to whether or not it is possible to start migrating a planning target virtual machine, for which a new migration plan is to be created, to a candidate migration destination physical server of the planning target virtual machine at a candidate migration start time based on a residual resource amount of the candidate migration destination physical server, a resource consumption of the planning target virtual machine, a sum of resource consumptions of migration-scheduled virtual machines that are scheduled to start migrating to the candidate migration destination physical server at the candidate migration start time, and the history information.

2. The apparatus according to claim 1, wherein
the planning module is configured to determine as to whether or not it is possible to start migrating the planning target virtual machine to the candidate migration destination physical server at the candidate migration start time by comparing first migration performance and second migration performance,
first migration performance is migration performance of such history information that the residual resource amount of the candidate migration destination physical server is close to the residual resource amount of the migration destination physical server stored in the history storage and the sum of the resource consumptions of the migration-scheduled virtual machines is close to a sum of resource consumptions of virtual machines stored in the history storage and
second migration performance that is migration performance of such history information that the residual resource amount of the candidate migration destination physical server is close to the residual resource amount of the migration destination physical server stored in the history storage and a sum of (i) a sum of the resource consumptions of the migration-scheduled virtual machines and (ii) the resource consumption of the planning target virtual machine is close to a sum of resource consumptions of virtual machines stored in the history storage.

3. The apparatus according to claim 2, wherein the planning module is configured to
determine, for each of the all candidate migration destination physical servers, as to whether it is possible to start migrating the planning target virtual machine to the candidate migration destination physical server at the candidate migration start time,
decide a migration destination physical server of the planning target virtual machine and a migration start time of the planning target virtual machine based on the determination result, and
update the planning target virtual machine to a migration-scheduled virtual machine.

4. The apparatus according to claim 3, wherein if the planning module has determined migration destination physical servers and migration start times for all respective planning target virtual machines, the virtual machine controller migrates the migration-scheduled virtual machines to the migration destination physical servers in predetermined time slots starting from the respective migration start times determined by the planning module parallel in time and stores, in the history storage, for each set of virtual machines that have been migrated to a same migration destination physical server parallel in time among the migrated migration-scheduled virtual machines, history information including the residual resource amount of the migration destination physical server, a sum of resource consumptions of the migrated virtual machines, and migration performance.

5. The apparatus according to claim 4, wherein the planning module is configured to compare a user of the planning target virtual machine with users of virtual machines whose migration start times have already been determined and not to employ a migration start time of a virtual machine of the same user as the planning target virtual machine as a migration start time of the planning target virtual machine.

6. The apparatus according to claim 5, wherein the planning module is configured to compare a type of service provided by the planning target virtual machine with types of services provided by virtual machines whose migration start times have already been determined, and not employ a migration start time of a virtual machine that provides the same type of service as the planning target virtual machine as a migration start time of the planning target virtual machine.

7. The apparatus according to claim 1, wherein the planning module is configured to compare a user of the planning target virtual machine with users of virtual machines whose migration start times have already been determined and not to employ a migration start time of a virtual machine of the same user as the planning target virtual machine as a migration start time of the planning target virtual machine.

8. The apparatus according to claim 7, wherein the planning module is configured to compare a type of service provided by the planning target virtual machine with types of services provided by virtual machines whose migration start times have already been determined, and not employ a migration start time of a virtual machine that provides the same type of service as the planning target virtual machine as a migration start time of the planning target virtual machine.

9. The apparatus according to claim 1, wherein the planning module is configured to compare a type of service provided by the planning target virtual machine with types of services provided by virtual machines whose migration start times have already been determined, and not employ a migration start time of a virtual machine that provides the same type of service as the planning target virtual machine as a migration start time of the planning target virtual machine.

10. A non-transitory computer readable storage medium storing a program that causes a computer to execute virtual machine management, the virtual machine management comprising:
migrating virtual machines between plural physical servers;
storing, for each set of first virtual machines that were migrated to a same migration destination physical server parallel in time among the virtual machines migrated by the virtual machine controller, history information including
a residual resource amount of the migration destination physical server,
a sum of resource consumptions of the respective first virtual machines, and
migration performance which is determined based on a number of first virtual machines migrated per unit time or a time taken by the first virtual machines to migrate; and
determining as to whether or not it is possible to start migrating a planning target virtual machine, for which a new migration plan is to be created, to a candidate migration destination physical server of the planning target virtual machine at a candidate migration start time based on a residual resource amount of the candidate migration destination physical server, a resource consumption of the planning target virtual machine, a sum of resource consumptions of migration-scheduled virtual machines that are scheduled to start migrating to the candidate migration destination physical server at the candidate migration start time, and the history information.

11. A virtual machine management method comprising:

migrating virtual machines between plural physical servers;

storing, for each set of first virtual machines that were migrated to a same migration destination physical server parallel in time among the virtual machines migrated by the virtual machine controller, history information including a residual resource amount of the migration destination physical server, a sum of resource consumptions of the respective first virtual machines, and migration performance which is determined based on a number of first virtual machines migrated per unit time or a time taken by the first virtual machines to migrate; and determining as to whether or not it is possible to start migrating a planning target virtual machine, for which a new migration plan is to be created, to a candidate migration destination physical server of the planning target virtual machine at a candidate migration start time based on a residual resource amount of the candidate migration destination physical server, a resource consumption of the planning target virtual machine, a sum of resource consumptions of migration-scheduled virtual machines that are scheduled to start migrating to the candidate migration destination physical server at the candidate migration start time, and the history information.

* * * * *